US012704484B2

(12) United States Patent
Rosenheim et al.

(10) Patent No.: US 12,704,484 B2
(45) Date of Patent: Aug. 11, 2026

(54) VIBRONIC MULTISENSOR

(71) Applicant: Endress+Hauser SE+Co. KG, Maulburg (DE)

(72) Inventors: Julia Rosenheim, Wehr (DE); Tobias Brengartner, Emmendingen (DE); Jan Schleiferböck, Rümmingen (DE); Benjamin Mack, Lörrach (DE); Pablo Ottersbach, Essen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 269 days.

(21) Appl. No.: 18/002,065

(22) PCT Filed: Jun. 16, 2021

(86) PCT No.: PCT/EP2021/066257

§ 371 (c)(1),
(2) Date: Dec. 16, 2022

(87) PCT Pub. No.: WO2021/255101

PCT Pub. Date: Dec. 23, 2021

(65) Prior Publication Data

US 2023/0221288 A1 Jul. 13, 2023

(30) Foreign Application Priority Data

Jun. 19, 2020 (DE) ..................... 10 2020 116 278.2

(51) Int. Cl.
*G01N 29/02* (2006.01)
*G01N 29/22* (2006.01)
(Continued)

(52) U.S. Cl.
CPC ........... *G01N 29/326* (2013.01); *G01N 29/02* (2013.01); *G01N 29/223* (2013.01); *G01N 29/2437* (2013.01)

(58) Field of Classification Search
CPC .... G01N 29/326; G01N 29/02; G01N 29/223; G01N 29/2437; G01N 11/16;
(Continued)

(56) References Cited

U.S. PATENT DOCUMENTS 5,369,600 A 11/1994 Ito et al.
2011/0179860 A1 7/2011 Urban et al.
(Continued)

FOREIGN PATENT DOCUMENTS

CN 102575956 A1 7/2012
CN 104024810 A1 9/2014
(Continued)

*Primary Examiner* — Robert R Raevis
(74) *Attorney, Agent, or Firm* — Gil M. Repa; Endress+Hauser (USA) Holding, Inc.

(57) ABSTRACT

A device for determining and/or monitoring a process variable of a medium includes a sensor unit having a mechanically oscillatable unit, a first piezoelectric element, a unit for determining and/or monitoring a temperature of the medium and an electronic system. The device is designed to excite the mechanically oscillatable unit and to receive the mechanical oscillations of the oscillatable unit, to convert them into a first receiving signal, to emit a transmission signal and to receive a second receiving signal, wherein the electronic system is designed to determine the process variable based on the first and/or second receiving signal. The unit for determining and/or monitoring the temperature includes a first and a second temperature sensor arranged at a distance from one another, and the electronic system is designed to determine the temperature of the medium based on a first and/or second temperature receiving signal.

4 Claims, 4 Drawing Sheets

Figure 1:
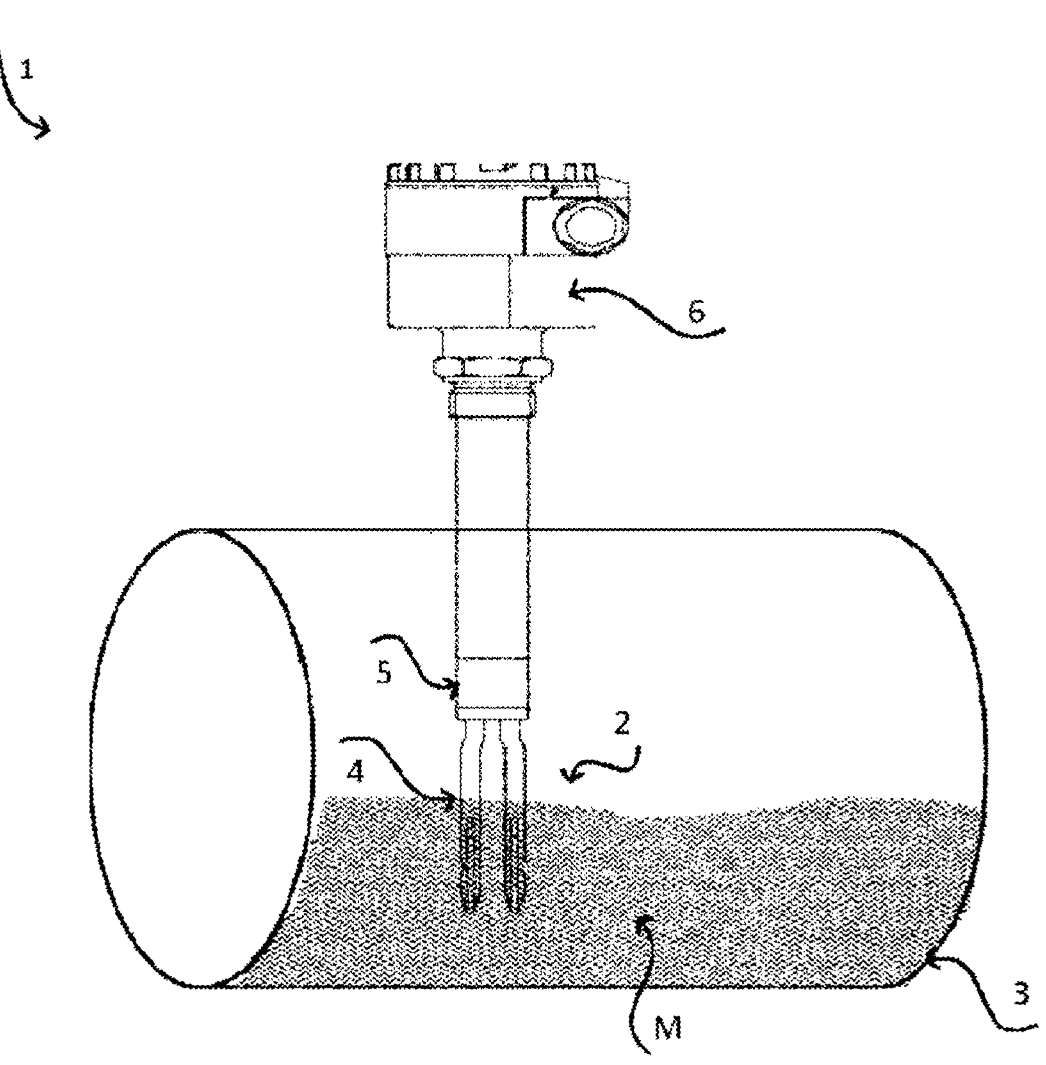

(51) Int. Cl.
*G01N 29/24* (2006.01)
*G01N 29/32* (2006.01)

(58) Field of Classification Search
CPC ........... G01N 9/002; G01N 2011/0006; G01N 2009/006; G01F 23/296
USPC ..... 73/1.02, 1.06, 19.03, 24.05, 24.06, 32 A, 73/54.01, 54.13, 54.24–54.26, 61.49, 291, 73/292, 290 V, 54.02, 54.41, 570, 584, 73/597
See application file for complete search history.

(56) References Cited

U.S. PATENT DOCUMENTS

| | | | |
|---|---|---|---|
| 2013/0104647 | A1 | 5/2013 | Lopatin et al. |
| 2018/0164252 | A1 | 6/2018 | Sears et al. |

FOREIGN PATENT DOCUMENTS

| | | | | |
|---|---|---|---|---|
| CN | 107278267 | A1 | | 10/2017 |
| CN | 107835936 | A1 | | 3/2018 |
| CN | 109477751 | A1 | | 3/2019 |
| CN | 110268235 | A1 | | 9/2019 |
| DE | 102006007199 | A1 | | 8/2007 |
| DE | 102013114045 | A1 | | 6/2015 |
| DE | 102014118282 | A1 | | 6/2016 |
| DE | 102015112543 | A1 | | 2/2017 |
| DE | 102016125243 | A1 | | 6/2018 |
| DE | 102017130530 | A1 | | 9/2019 |
| DE | 102018127526 | A1 | | 5/2020 |
| DE | 102018128734 | A1 | | 5/2020 |
| EP | 1909078 | A1 | | 4/2008 |
| EP | 3602040 | | * | 7/2022 |
| JP | 5172719 | A | | 3/2013 |
| KR | 100780819 | | * | 11/2007 |
| WO | 2013113446 | A1 | | 8/2013 |
| WO | 2019120941 | A1 | | 6/2019 |

* cited by examiner

VIBRONIC MULTISENSOR

The invention relates to a device for determining and/or monitoring at least one process variable of a medium, comprising a sensor unit with a mechanically oscillatable unit, at least one piezoelectric element, a unit for determining and/or monitoring the temperature of the medium, and with an electronics unit. The present invention further relates to a method for determining and/or monitoring the at least one process variable of the medium. The medium is located in a receptacle, e.g., in a container or in a pipeline.

Vibronic sensors are often used in process and/or automation engineering. In the case of fill-level measuring devices, they have at least one mechanically oscillatable unit such as, for example, a vibrating fork, a single rod, or a diaphragm. In operation, this is excited to produce mechanical oscillations by means of a drive/receiver unit, often in the form of an electromechanical transducer unit, which in turn can be a piezoelectric drive or an electromagnetic drive, for example. A wide variety of corresponding field devices are produced by the applicant and are distributed under the name LIQUIPHANT or SOLIPHANT, for example. The underlying measurement principles are known in principle from numerous publications. The drive/receiver unit excites the mechanically oscillatable unit to produce mechanical oscillations by means of an electrical excitation signal. Conversely, the drive/receiver unit can receive the mechanical oscillations of the mechanically oscillatable unit and convert them into an electrical receiving signal. The drive/receiver unit is accordingly either a separate drive unit and a separate receiver unit, or a combined drive/receiver unit.

In many instances, the drive/receiver unit is thereby part of an electrical resonant feedback circuit by means of which the excitation of the mechanically oscillatable unit to produce mechanical oscillations takes place. For example, the resonant circuit condition according to which the amplification factor is and all phases occurring in the resonant circuit result in a multiple of 360° must be fulfilled for a resonant oscillation. To excite and fulfill the resonant circuit condition, a defined phase shift must be ensured between the excitation signal and the receiving signal. A specifiable value for the phase shift, and thus a setpoint for the phase shift between the excitation signal and the receiving signal, is therefore often set. For this purpose, various solutions, both analog and digital methods, have become known from the prior art, as described, for example, in documents DE102006034105A1, DE102007013557A1, DE102005015547A1, DE102009026685A1, DE102009028022A1, DE102010030982A1, or DE00102010030982A1.

Both the excitation signal and the receiving signal are characterized by their frequency $\omega$, amplitude A, and/or phase $\phi$. Accordingly, changes in these variables are usually used to determine the respective process variable. The process variable can, for example, be a fill-level, a specified fill-level, or the density or the viscosity of the medium, and also the flow rate. With a vibronic level switch for liquids, for example, a distinction is made between whether the oscillatable unit is covered by the liquid or oscillates freely. These two conditions—the free condition and the covered condition—are differentiated, for example, on the basis of different resonance frequencies, i.e., on the basis of a frequency shift.

The density and/or viscosity can in turn only be determined with such a measuring device if the oscillatable unit is completely covered by the medium. In connection with the determination of the density and/or viscosity, different possibilities have likewise become known from the prior art, such as those disclosed in documents DE10050299A1, DE102007043811A1, DE10057974A1, DE102006033819A1, DE102015102834A1, or DE102016112743A1.

With a vibronic sensor, several process variables can accordingly be measured and be used for characterizing the respective process. In many cases, however, further information about the process, especially, knowledge of further physical and/or chemical process variables and/or process parameters, is required for comprehensive process monitoring and/or control. This can be achieved, for example, by integrating further field devices into the respective process. The measured values provided by the various measuring devices can then be further processed in a suitable manner in a unit superordinate to the devices.

However, it is now the case that the different measuring devices, for one, have different measurement accuracies. In addition, drift and/or aging effects can in each case be very different. However, such effects can make the respective measurement or process monitoring and/or control considerably more difficult or imprecise. In addition, it may be difficult in each case to determine the respective state of the individual field devices during continuous operation. A vibronic multisensor, by means of which both the vibronic measuring principle and the ultrasonic measuring principle for determining and/or monitoring one or more process variables are possible, has therefore become known from the previously unpublished German patent application with reference number 102018127526.9.

Starting from the cited prior art, the present invention is based upon the object of further enhancing the functionality and measurement accuracy of such a vibronic sensor.

This object is achieved by the device and by the method according to the present disclosure.

With regard to the device, the object is achieved by a device for determining and/or monitoring at least one process variable of a medium, comprising a sensor unit with a mechanically oscillatable unit, at least one first piezoelectric element, and with a unit for determining and monitoring the temperature of the medium, and an electronics unit. The device is designed to excite the mechanically oscillatable unit to mechanical oscillations by means of an excitation signal, to receive mechanical oscillations of the oscillatable unit and convert them into a first receiving signal, to emit a transmission signal, and to receive a second receiving signal. The electronics unit is designed to determine the at least one process variable using the first and/or second receiving signal. According to the invention, the unit for determining and/or monitoring the temperature comprises a first and a second temperature sensor, which first and second temperature sensors are arranged at a distance from one another, wherein the electronics unit is configured to determine the temperature of the medium by using a first and/or second temperature receiving signal of the first and/or second temperature sensor received by the unit.

The mechanically oscillatable unit is, for example, a membrane, a single rod, an arrangement of at least two oscillating elements, or a tuning fork. The at least one piezoelectric element can be arranged, for example, in the region of the oscillatable unit. It serves on the one hand as a drive/receiver unit for generating the mechanical oscillations of the mechanically oscillatable unit which are generated by means of the excitation signal. In the event that the oscillatable unit is covered by medium, the mechanical oscillations are in turn influenced by the properties of the medium, so that a conclusion about the at least one process variable can be generated using the first receiving signal representing the oscillations of the oscillatable unit.

The piezoelectric element furthermore serves to generate a transmission signal which is received in the form of the second receiving signal. If, on its way, the transmission signal passes through the medium at least temporarily and in segments, it is likewise influenced by the physical and/or chemical properties of the medium and can be used accordingly for determining a process variable of the medium.

It is thus possible, within the scope of the present invention, to implement at least two measurement principles in a single device. The sensor unit carries out mechanical oscillations on the one hand; in addition, a transmission signal is emitted. In response to the mechanical oscillations and to the transmission signal, two receiving signals are received and can, for example, be evaluated with respect to at least two different process variables. The two receiving signals can, advantageously, be evaluated independently of one another. In this way, according to the invention, the number of determinable process variables can be significantly increased, which results in a higher functionality of the respective sensor or in an extended field of application.

Furthermore, the device according to the invention comprises a unit for determining and/or monitoring the temperature of the medium. This unit comprises two temperature sensors arranged at a distance from one another to which the same or different temperature signals can be applied. The temperature of the medium, e.g., as a third process variable, can then be determined by using the first and/or second temperature receiving signal received from the unit. Because the two temperature sensors are arranged at a distance from one another, the temperature can be determined very precisely. In particular, an inhomogeneous temperature distribution in the region of the sensor unit can be taken into account due to different thermal conductivities of different components of the sensor unit, the medium, and the receptacle, and due to different temperatures of the surroundings of the device and the medium, and due to temperature changes of the medium or the surroundings of the device.

The temperature of both the environment and the medium has a significant influence on a wide range of other process variables of the medium. By means of an additional measurement and/or monitoring of the temperature, in particular at different positions, the measurement accuracy of the multi-sensor can accordingly be significantly improved, and the functionality of the sensor can be considerably increased.

In one embodiment, the sensor unit comprises at least one second piezoelectric element, wherein the first and second piezoelectric elements are designed to excite the mechanically oscillatable unit to produce mechanical oscillations by means of an excitation signal, and to receive the mechanical oscillations of the oscillatable unit and convert them into a first receiving signal, wherein the first piezoelectric element is designed to emit a transmission signal, and wherein the second piezoelectric element is designed to receive the transmission signal in the form of a second receiving signal. However, more than two piezoelectric elements, which may be arranged at different positions relative to the oscillatable unit, may also be present.

In another embodiment, the mechanically oscillatable unit is a vibrating fork with a first and a second oscillating element, wherein the first piezoelectric element is at least partially arranged in the first oscillating element, and the second piezoelectric element is at least partially arranged in the second oscillating element. Corresponding embodiments of a sensor unit have been described, for example, in the documents DE102012100728A1 as well as DE102017130527A1. Both applications are referred to in their entirety within the framework of the present invention. The possible embodiments of the sensor unit described in the two documents are exemplary, possible structural embodiments of the sensor unit. For example, it is also not absolutely necessary to arrange the piezoelectric elements exclusively in the region of the oscillating elements. Rather, individual piezoelectric elements of those used may also be arranged in the region of the diaphragm, or in further oscillating elements which are not used for the vibronic excitation, and which are likewise applied to the diaphragm.

In another embodiment of the device, the first temperature sensor is arranged and/or configured to detect a first temperature in a first end region, facing the medium, of the sensor unit, wherein the second temperature sensor is arranged and/or configured to detect a second temperature in a second end region, facing away from the medium, of the sensor unit, in particular in a region in which the at least one piezoelectric element is arranged.

By detecting the temperature in a section, facing the medium, and a section, facing away from the medium, of the sensor unit, heat conduction in the region of the sensor unit can, advantageously, be determined. As already mentioned, the process variables determinable by means of the multi-sensor depend significantly upon the temperature of the medium, and also upon the temperature of the sensor unit. In order to enable highly accurate and reliable measurement, accurate, spatially resolved information on the temperature profile to which the sensor unit is exposed is of great importance.

For this purpose, at least one of the two temperature sensors can be arranged, for example, on or in the sensor unit. In the case of a sensor unit in the form of an oscillating fork, it is conceivable, for example, for at least one temperature sensor to be positioned on or in one of the oscillating elements. For example, a temperature sensor can be arranged in a section, facing the medium, of one of the oscillating elements, and the other temperature sensor can be arranged in an end region, facing away from the medium, of one of the oscillating elements.

It is further advantageous if the unit for determining and/or monitoring a temperature comprises a rod-shaped housing element which is arranged such that a longitudinal axis of the housing element is parallel to a longitudinal axis of the oscillatable unit, and wherein the first temperature sensor is arranged in a first end region, facing the medium, of the housing element, and wherein the second temperature sensor is arranged in a second end region, facing away from the medium, of the housing element. The temperature sensors are therefore positioned separately from the oscillatable unit. Such an embodiment makes it easier, e.g., in the case of a sensor unit in the form of an oscillating fork, to ensure a symmetrical configuration of the two oscillating elements.

In another embodiment of the device, the unit for determining and/or monitoring the temperature comprises a temperature sensor in the form of a resistor element or a thermocouple.

It is basically advantageous if the unit for determining and/or monitoring the temperature, in particular the two temperature sensors, is arranged such that it has an excellent thermal coupling to the medium and/or to the sensor unit. In order to eliminate influences by the temperature on the particular process variables, a thermal coupling to the medium is required in particular. It is then advantageous if the two temperature sensors each come into contact with the medium at least temporarily and/or partially. In principle, a spatial proximity to the sensor unit is preferred. It is also advantageous if the sensor unit is configured such that its thermal capacity is as low as possible. In this case, a response time while determining temperature, in the event of a change in the temperature of the medium, is low.

In another preferred embodiment of the device, the sensor unit comprises a unit for determining and/or monitoring a pressure, and/or a unit for determining and/or monitoring a conductivity and/or capacitance of the medium. By implementing additional measurement principles in a single sensor, the application range and the measurement accuracy of the sensor can be further broadened or increased.

The object upon which the invention is based is further achieved by a method for determining and/or monitoring at least one process variable of a medium, wherein

- a sensor unit is excited to oscillate mechanically by means of an excitation signal,
- the mechanical oscillations are received by the sensor unit and converted into a first receiving signal,
- the sensor unit emits a transmission signal and receives a second receiving signal,
- the at least one process variable is determined using the first and/or second receiving signal, and
- a first and/or second value for at least one temperature is determined by using a first and a second temperature receiving signal received from a first temperature sensor and/or a second temperature sensor.

The method is applicable in particular for a device according to one of the previously described embodiments. On the one hand, it is conceivable that the excitation signal and the transmission signal be simultaneously supplied to the sensor unit, wherein the excitation signal and the transmission signal are superimposed upon one another. Alternatively, however, the excitation signal and the transmission signal can also be alternately supplied to the sensor unit.

The excitation signal is, for example, an electrical signal having at least one specifiable frequency, especially a sinusoidal or a rectangular-wave signal. The mechanically oscillatable unit is preferably excited at least temporarily to produce resonance oscillations. The mechanical oscillations are influenced by the medium surrounding the oscillatable unit, so that conclusions regarding various properties of the medium are possible based upon a receiving signal representing the oscillations.

The transmission signal is preferably an ultrasound signal, especially a pulsed ultrasound signal, especially at least one ultrasound pulse. An ultrasound-based measurement is accordingly carried out within the scope of the present invention as the second measurement method that is used. The respective emitted transmission signal at least partially passes through the medium and is influenced by the latter in terms of its properties. Accordingly, conclusions about different media can likewise be drawn using the respectively received second receiving signal.

For determining the temperature, the same or different temperature signals are applied to the two temperature sensors. The application of the at least one temperature signal can also take place simultaneously or alternately to the application of the excitation signal and/or transmission signal to the sensor unit.

With the method according to the invention, a plurality of different process variables can be determined by means of different measurement principles. In addition, the influence of the temperature can be taken into account in each case. Different process variables can, advantageously, be measured independently of one another, so that a comprehensive analysis of the respective process is made possible by means of a single measuring device. In addition, by using the same sensor unit for several measurement methods, the accuracy of the measurements can be significantly increased. Moreover, monitoring the state of the device may be performed using the various measurement principles. Numerous embodiments are possible in this regard of the method according to the invention, of which some preferred variants are specified below.

In one embodiment of the method, the at least two different process variables are determined, wherein a first process variable is determined using the first receiving signal, and wherein a second process variable is determined using the second receiving signal.

In another embodiment, at least one process variable is a predeterminable fill-level, the density, the viscosity, the sound velocity, or a variable derived from at least one of these variables. Particularly preferably, the density and/or viscosity of the medium is therefore measured using the first receiving signal, and the sound velocity within the medium is therefore measured using the second receiving signal. However, it is implicitly understood that, in addition to the process variables explicitly mentioned here, further process variables and/or process parameters which are accessible by means of the two performed measurements can likewise be measured and used for characterizing the respective process.

In one embodiment of the method, an influence of the temperature of the medium on the first and/or second receiving signal or on the first and/or second process variable is compensated for. In this case, a wide variety of variants are conceivable which all fall under the present invention. By way of example, the influence of the temperature on one of the two receiving signals can be compensated for by means of one of the two temperature receiving signals, and the influence of the temperature on the respective other receiving signal can be compensated for by means of the other temperature receiving signal. It is also possible to compensate for the influence of the temperature on both receiving signals by means of a temperature receiving signal, or to compensate for each of the two receiving signals by means of the two temperature receiving signals.

In one embodiment of the method, a value for a first temperature is detected by means of the first temperature sensor in an end region, facing the medium, of the sensor unit, and/or a value for a second temperature is detected by means of the second temperature sensor in an end region, facing away from the medium, of the sensor unit, and/or one of the temperatures is used in each case for determining one of the process variables. For example, the temperature in an end region, facing the medium, of the sensor unit, in particular in the case of an oscillatable unit in the form of an oscillating fork, has a considerable influence on the values for the density and viscosity measured by means of the sensor. Both process variables change not only as a function of the medium, but also as a function of the temperature. Precise knowledge of the temperature in the region of the sensor unit, which is sensitive to the density and viscosity, therefore ensures a significant increase in the measurement accuracy with respect to these process variables. In many cases, this temperature in a region, facing the medium, of the sensor unit is, however, different from a temperature in an end region, facing away from the medium, of the sensor unit, inter alia, due to heat conduction from the process to the environment, or vice versa. If the at least one piezoelectric element is arranged, for example, in this end region facing away from the medium, a sound velocity in this end region facing away from the medium is also measured. Since the sound velocity also depends upon the temperature, it is useful to determine the temperature in this end region, facing away from the medium, of the sensor unit in order to compensate for the influence of the temperature on the sound velocity. Two temperature sensors spaced apart from one another therefore, in this example cited, significantly increase the achievable measurement accuracy with respect to the determined process variables.

In another embodiment of the method, based upon the first and/or second temperature receiving signal, an influence of the temperature on at least one physical and/or chemical property of at least one component of the sensor unit, upon which property the at least one process variable depends, is compensated for. Following on the aforementioned example, the density and/or viscosity are determined by using the mechanical oscillations of the mechanically oscillatable unit. For this purpose, the oscillatable unit is excited, for example, to resonant oscillations. The resonance frequency is in this case dependent upon the modulus of elasticity of the oscillatable unit, which in turn also depends upon the temperature. In this case as well, a precise knowledge of the temperature is therefore of great value in increasing the measurement accuracy. In the case of an oscillatable unit, the resonance frequency is, for example, decisively influenced by the section, facing away from the medium, of the sensor unit—the root region of the oscillating elements.

Another embodiment provides that, by using the temperature of the medium, a statement be made about a process through which the medium passes. For example, a mixing operation of different media with different temperatures can be detected and/or monitored by using the respectively determined temperature. In this case, the temperature of the mixture can briefly fluctuate for a short time, which can negatively influence the measurement of the respective process variable. It can also be recognized whether a corresponding sensor is operated outside a permissible working range for the temperature. Yet another possible statement is the recognition of a cleaning process which is carried out for the respective sensor. In a cleaning process, the different cleaning cycles can be detected and/or monitored. Frequently, treatments of the sensor unit at high temperatures, e.g., with hot water vapor, follow cold water rinses which are accompanied by large temperature changes of the temperatures determined by means of the unit for determining and/or monitoring the temperature. It is also conceivable to carry out a calibration of the sensor unit during individual process steps in a cleaning process—for example, during a cold rinsing process.

In one embodiment of the method, a value for the first and/or second temperature is determined by using an electromechanical efficiency or a capacitance of at least one piezoelectric element of the sensor unit. The measurement of the temperature by using the electromechanical efficiency of a piezoelectric element is described, for example, in detail in document DE102016120326A1, to which reference is made in full within the scope of the present invention. A measurement of the temperature by using the capacitance of a piezoelectric element is also known per se from the prior art.

It is then advantageous if, for the first and/or second temperature, the value thereof determined by using the first and/or second temperature receiving signal and the value thereof determined by using the electromechanical efficiency or the capacitance are compared with one another, and wherein, in particular in the case that a deviation between the values determined by means of the first and/or second temperature receiving signal and the values determined by using the electromechanical efficiency or the capacitance exceeds a specifiable limit value, a statement is made about the at least one piezoelectric element or the first and/or second temperature sensor. A diagnosis of the sensor unit by using the determined values for the temperature is therefore likewise possible.

The diagnosis can include, for example, a statement about the unit for determining and/or monitoring the temperature, in particular via the first and/or second temperature sensor, or a statement about the state of the first and/or second piezoelectric element. Advantageously, a plausibility check of individual applied measuring principles, in particular of the two receiving signals, and of the temperature receiving signals received by the unit for determining and/or monitoring the temperature, can be carried out in this way.

In another embodiment of the method according to the invention, by using a difference between the values, determined by using the first and second temperature receiving signals, for the first and second temperatures, a heat dissipation, in particular a heat dissipation in the region of the sensor unit, is determined, wherein, in particular in the event that the difference exceeds a specifiable limit value, a warning is output.

The two temperature sensors can accordingly also be compared to one another. A comparison of the other measuring principles with respect to one another can also be made dependent upon the prevailing, spatially resolved temperature profile in the region of the sensor unit. In addition, it is conceivable to output a maximum permissible difference between an ambient temperature and the temperature of the medium, which guarantees a reliable operation of a corresponding device, and, in the event that the difference exceeds this limit value, to output a warning.

It is, moreover, advantageous if a reference value for the density is determined by using the sound velocity, wherein the reference value is compared by means of a value for the density determined from the first receiving signal. A concentration of a reference substance, dissolved in a reference medium, in a specifiable container is preferably determined on the basis of the sound velocity determined from the second receiving signal. The reference value for the density of the reference medium can subsequently be determined from the concentration. Moreover, a measured value for the density can be determined from the first receiving signal. The two values for the density can then be compared with one another. The value for the density determined from the first receiving signal can, especially, be adjusted on the basis of the reference value for the density determined from the second receiving signal. In this way, an adverse influence on the geometry of the respectively used receptacle on the vibronic determination of the density can be compensated for.

In yet another particularly preferred embodiment, a first concentration of a first substance contained in the medium and a second concentration of a second substance contained in the medium are determined using the first and second receiving signals and/or using the first and second process variables. According to the prior art, for such an analysis of the medium with respect to two different substances, two separate measuring devices that provide different measurands are usually required. According to the invention, by contrast, a statement about two different components in a medium can be reliably made by means of a single device.

A preferred use of the method relates to the monitoring of a fermentation process. In fermentation, sugar is converted to ethanol. In order to be able to ensure qualitative monitoring, it is therefore necessary to determine the concentration of both sugar and ethanol. This is possible within the framework of the present invention.

Finally, in an advantageous embodiment of the method, using the first and second receiving signals and/or using the first and second process variables, it is determined whether a deposit has been formed on the sensor unit and/or whether a drift and/or aging of the sensor unit is present. The two receiving signals are typically in each case different, depending upon a deposit on the probe unit, a drift, or an aging in the region of the sensor unit. The presence of a deposit, a drift, or an aging can accordingly be determined, for example, using a temporal consideration of the two receiving signals and/or process variables.

It is advantageous for the first and second receiving signals, the first and second process variables, and/or a time profile of the first and second receiving signals and/or of the first and second process variables to be compared with one another. The presence of a deposit, a drift, or aging of the sensor unit can then be inferred from the comparison. Since at least two receiving signals or process variables are accessible, a high degree of accuracy with regard to the statements made in each case about a deposit, a drift, or aging can be achieved. By implementing, according to the invention, two different measurements with a single sensor unit, the presence of a deposit, or also a drift or aging of the sensor unit can accordingly be reliably detected.

In another particularly preferred embodiment, an influence of a deposit, a drift, and/or aging of the sensor unit on the first and/or the second receiving signal is reduced or compensated for in the determination and/or monitoring of at least one process variable, or in the determination of a variable derived from at least one process variable and/or from at least one receiving signal. Accordingly, the influence of a deposit, a drift, and/or aging of the sensor unit can be taken into account in the determination and/or monitoring of the respective process variable, so that the respective process variable can be determined without relying on the presence of a deposit, a drift, and/or aging. In order to reduce or compensate for the influence, a suitable, in particular process-dependent, algorithm can, for example, be stored, with the aid of which a value that is not falsified by the influence of the deposit, the drift, and/or aging of the sensor unit can be determined for the respective process variable. Accordingly, an improved measurement accuracy can be achieved, and a possibility for predictive maintenance can therefore be provided.

It should be pointed out that the embodiments described in connection with the device according to the invention can also be applied, mutatis mutandis, to the method according to the invention, and vice versa.

Figure 2A:
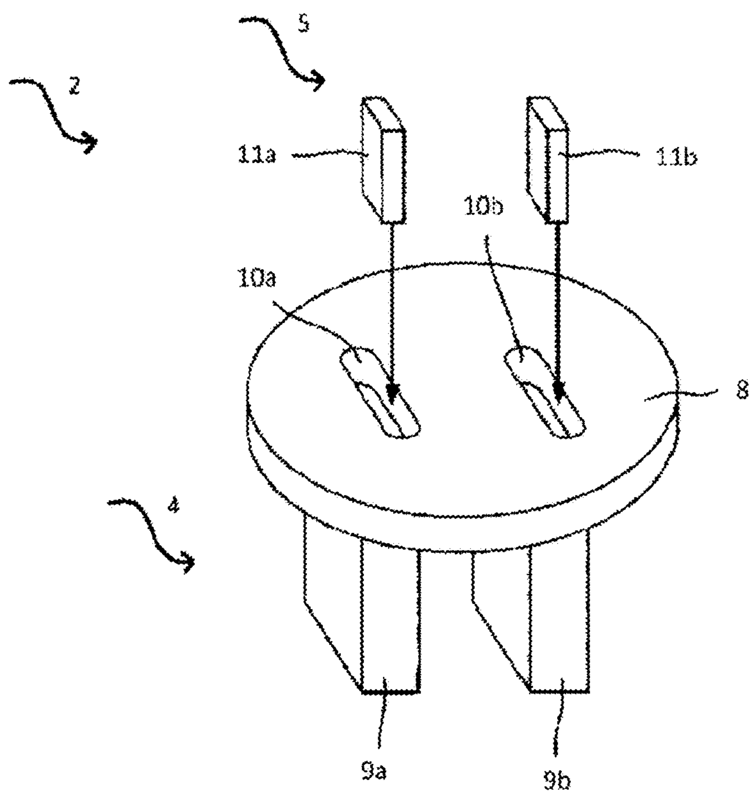
Figure 2B:
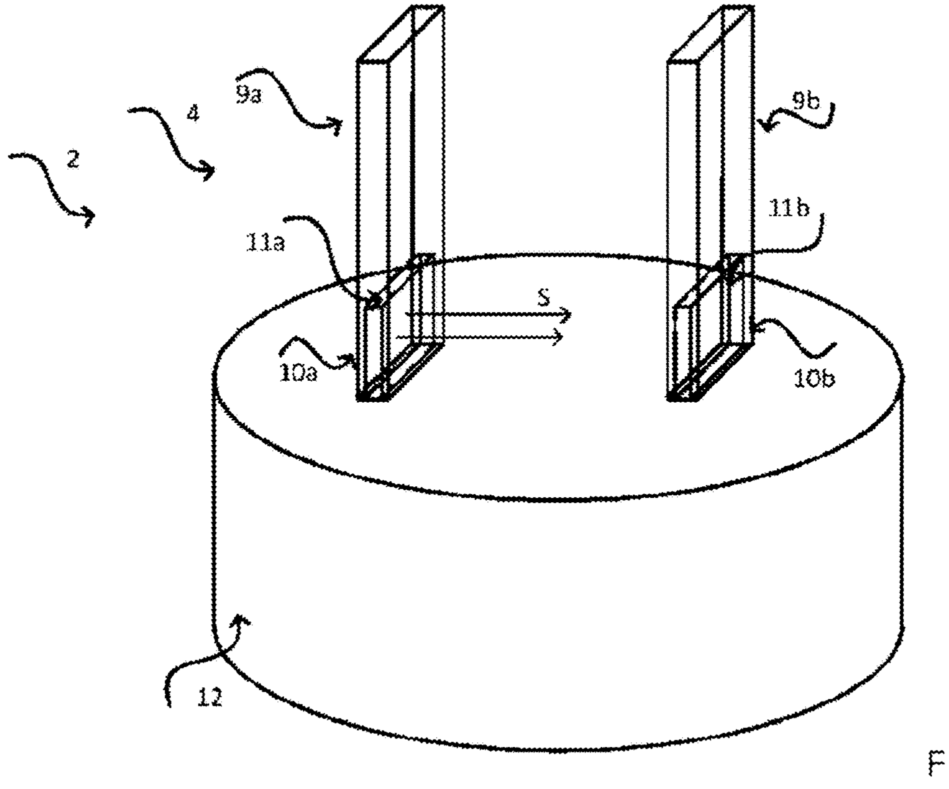
Figures 2C, 2D:
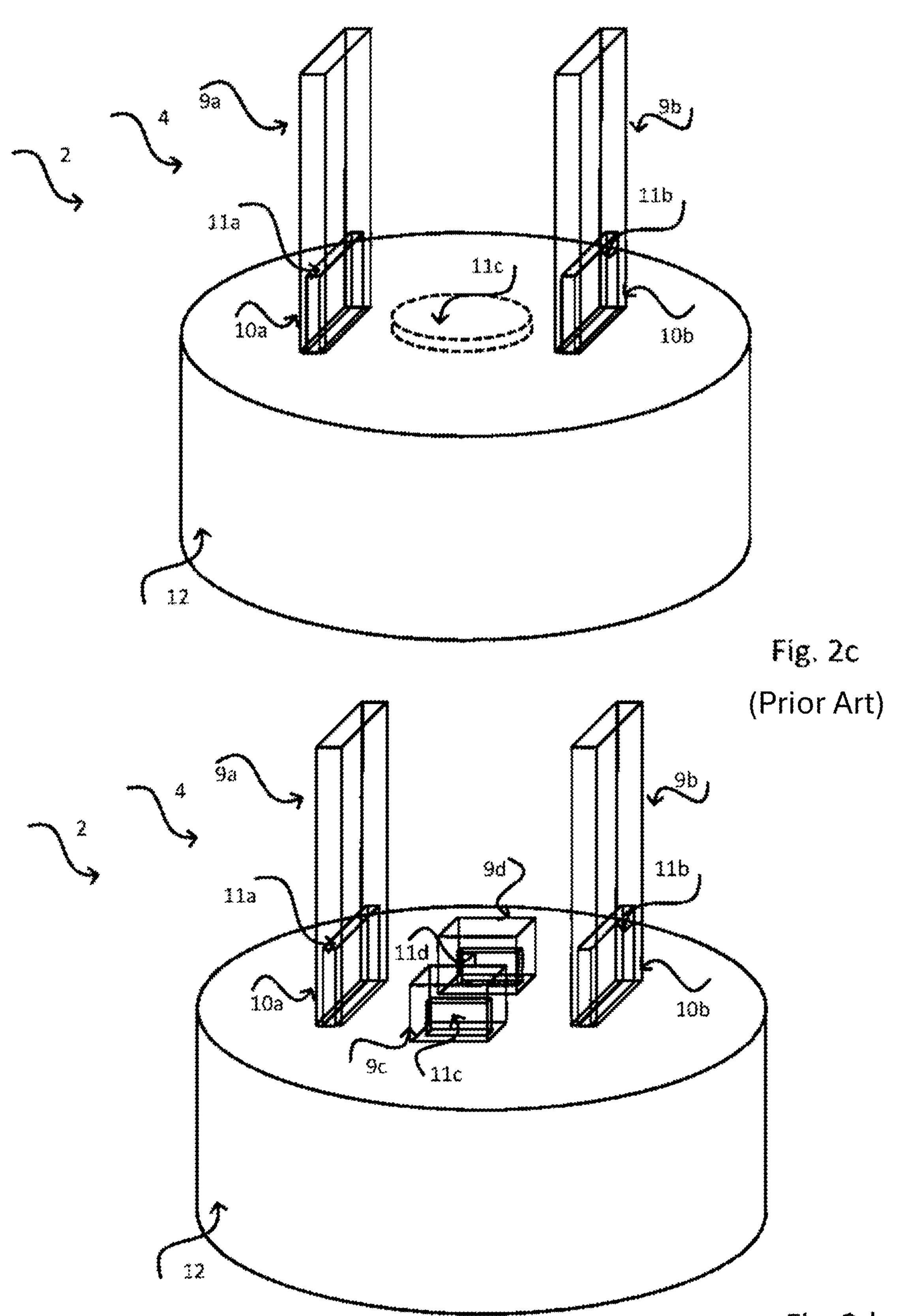
Figure 3:
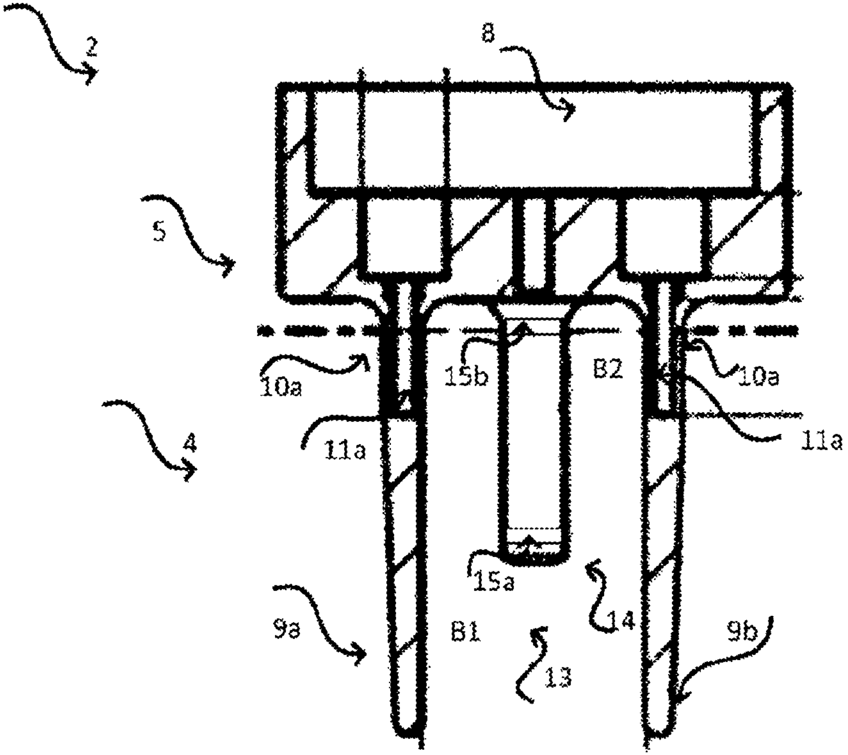

FIG. 1 shows a schematic drawing of a vibronic sensor according to the prior art, FIGS. 2*a*, 2*b*, 2*c*, and 2*d* show several possible embodiments of a sensor unit that are known per se from the prior art and are suitable for carrying out the method according to the present disclosure, and FIG. 3 shows a possible embodiment of a device according to the present disclosure with a unit for determining the temperature of the medium.

In the figures, identical elements are respectively provided with the same reference signs.

FIG. 1 shows a vibronic sensor 1 having a sensor unit 2. The sensor has a mechanically oscillatable unit 4, in the form of a vibrating fork, which is partially dipped into a medium M which is located in a container 3. The oscillatable unit 4 is excited by the excitation/receiving unit 5 to mechanical oscillations and can, for example, be excited by means of a piezoelectric stack drive or bimorphic drive. Other vibronic sensors have electromagnetic drive/receiver units 5, for example. It is possible to use a single drive/receiver unit 5 which serves both to excite the mechanical oscillations and to detect them. However, it is conceivable as well to realize one each of a drive unit and a receiver unit. Furthermore, depicted in FIG. 1, is an electronics unit 6 by means of which the signal acquisition, evaluation, and/or feed takes place.

FIGS. 2*a*, 2*b*, 2*c*, and 2*d* show, by way of example, various sensor units 2, which are suitable for carrying out a method according to the present disclosure. The mechanically oscillatable unit 4 shown in FIG. 2*a* comprises two oscillating elements 9*a*, 9*b*, which are mounted on a base 8 and which are therefore also referred to as fork teeth. Optionally, a paddle [not shown here] may respectively also be formed on the end sides of the two oscillating elements 9*a*, 9*b*. In each of the two oscillating elements 9*a*, 9*b*, a cavity 10*a*, 10*b*, and, especially, a pocket-like cavity, is respectively introduced, in which at least one piezoelectric element 11*a*, 11*b* of the drive/receiver unit 5 is respectively arranged. Preferably, the piezoelectric elements 11*a* and 11*b* are embedded in the cavities 10*a* and 10*b*. The cavities 10*a*, 10*b* can be such that the two piezoelectric elements 11*a*, 11*b* are located completely or partially in the region of the two oscillating elements 9*a*, 9*b*. Such an arrangement along with similar arrangements are extensively described in DE102012100728A1.

Another possible exemplary embodiment of a sensor unit 2 is depicted in FIG. 2*b*. The mechanically oscillatable unit 4 has two oscillating elements 9*a*, 9*b*, which are aligned in parallel to one another and are configured here in a rod-shaped manner. They are mounted on a disk-shaped element 12 and can be excited separately from one another to oscillate mechanically. Their oscillations can likewise be received and evaluated separately from one another. The two oscillating elements 9*a* and 9*b* respectively have a cavity 10*a* and 10*b*, in which at least one piezoelectric element 11*a* and 11*b* is respectively arranged in the region facing the disk-shaped element 12. With respect to the embodiment according to FIG. 2*b*, reference is in turn further made to the previously unpublished German patent application with reference number DE102017130527A1.

As shown schematically in FIG. 2*b*, the sensor unit 2 is supplied on the one hand with an excitation signal in such a way that the oscillatable unit 4 is excited to oscillate mechanically. The oscillations are generated by means of the two piezoelectric elements 11*a* and 11*b*. It is conceivable that the same excitation signal be applied to both piezoelectric elements, as well as that a first excitation signal [A1] be applied to the first oscillating element 9*a* and a second excitation signal be applied to the second oscillating element 9*b*. It is also conceivable for a first receiving signal to be received on the basis of the mechanical oscillations, or for each oscillating element 9*a*, 9*b* to receive a separate receiving signal.

In addition, a transmission signal S is emitted from the first piezoelectric element 11*a* and is received in the form of a second receiving signal by the second piezoelectric element 11*b*. Since the two piezoelectric elements 11*a* and 11*b* are arranged at least in the region of the oscillating elements 9*a* and 9*b*, the transmission signal S passes through the medium M, provided that the sensor unit 2 is in contact with the medium M and is influenced accordingly by the properties of the medium M. The transmission signal S is, for example, an ultrasonic signal, for example, a pulsed ultrasonic signal, and, for example, at least one ultrasonic pulse. However, it is also conceivable for the transmission signal S to be emitted by the first piezoelectric element 11*a* in the region of the first oscillating element 9*a* and to be reflected at the second oscillating element 9*b*. In this case, the second receiving signal is received by the first piezoelectric element 11*a*. In this case, the transmission signal S passes through the medium M twice, which leads to a doubling of a transit time of the transmission signal S.

In addition to these two embodiments shown of an apparatus 1, numerous other variants are also conceivable given the benefit of the current disclosure. For example, for the embodiments according to FIG. 2*a* and FIG. 2*b*, it is possible to use only one piezoelectric element 11*a*, 11*b* and to arrange it at least in one of the two oscillating elements 9*a*, 9*b*. In this case, the piezoelectric element 11*a* serves to generate the excitation signal and the transmission signal S, and to receive the first and the second receiving signal. In this case, the transmission signal is reflected at the second oscillating element 9*b* without piezoelectric element 11*b*.

Another exemplary possibility is depicted in FIG. 2*c*. Here, a third piezoelectric element 11*c* is provided in the region of the membrane 12. The third piezoelectric element 11*c* serves to generate oscillations by having the excitation signal applied and to receive the first receiving signal; the first 11*a* and the second piezoelectric element 11*b* serve to generate the transmission signal S or to receive the second receiving signal. Alternatively, it is possible, for example, to generate the excitation signal and the transmission signal S, and receive the second receiving signal with the first 11*a* and/or the second piezoelectric element 11*b*, wherein the third piezoelectric element 11*c* serves to receive the first receiving signal. It is also possible to generate the transmission signal S with the first 11*a* and/or the second piezoelectric element 11*b*, and the excitation signal with the third piezoelectric element 11*c*, and to receive the first and/or the second receiving signal with the first 11*a* and/or the second piezoelectric element 11*b*. In the case of FIG. 2*c*, it is also possible for other embodiments to dispense with the first 11*a* or the second piezoelectric element 11*b*.

Yet another possible embodiment of the apparatus 1 is the subject matter of FIG. 2*d*. Starting from the embodiment of FIG. 2*b*, the apparatus comprises a third 9*c* and a fourth oscillating element 9*d*. However, the latter do not serve to generate oscillations. Rather, a third 11*c* and a fourth piezoelectric element 11*d* are respectively arranged in the additional elements 9*c*, 9*d*. In this case, the vibronic measurement is carried out by means of the first two piezoelectric elements 11*a*, 11*b*, and the ultrasonic measurement by means of the other two piezoelectric elements 11*c*, 11*d*. Here as well, a piezoelectric element, e.g., 11*b* and 11*d*, can be dispensed with, depending upon the measurement principle. For reasons of symmetry, however, it is advantageous to always use two additional oscillating elements 9*c*, 9*d*.

The first and second receiving signals result from different measuring methods and can be evaluated independently of one another with respect to at least one process variable. In this regard, reference is made to the previously unpublished German patent application with the reference number 102018127526.9, to which reference is made in full within the scope of the present present disclosure.

Furthermore, according to the present disclosure, the temperature can be determined very accurately and reliably, and the influence thereof on the particular determined process variables can be compensated for. For this purpose, the device according to the present disclosure has a unit for determining and/or monitoring the temperature, as illustrated in FIG. 3. For the shown example, the sensor unit 2 is designed analogously to the variant from FIG. 2*a*. Between the two oscillating elements 9*a* and 9*b*, the unit 13 is arranged for determining and/or monitoring the temperature of the medium, which comprises a rod-shaped housing element 14 in which a first temperature sensor 15*a* and a second temperature sensor 15*b* are arranged spaced apart from one another. The temperature sensors can be designed, for example, in the form of resistance elements or thermocouples. The first temperature sensor 15*a* is configured to determine a first temperature in an end region B1, facing the medium M, of the sensor unit 2, while the second temperature sensor 15*b* is configured to determine a second temperature in an end region B2, facing away from the medium M, of the sensor unit 2. The first and second temperatures usually differ from one another due to different temperatures of the medium and the environment. In order to be able to determine all available process variables highly accurately, knowledge of the spatially resolved temperature profile of the sensor unit 2 is therefore of great importance. Because of the determination of the temperature at different positions, the achievable measurement accuracy of the multisensor 1 can be considerably increased, and, moreover, a further diagnostic function can be provided.

Alternative variants not presented separately here for a device 1 according to the invention can, for example, be such that at least one temperature sensor 15*a*, 15*b* is arranged in the region of an oscillating element 9*a*, 9*b* or in the region of the base 8. It is also conceivable to use more than two temperature sensors 15 which are positioned at a distance from one another.

LIST OF REFERENCE SIGNS

1 Vibronic sensor
2 Sensor unit
3 Container
4 Oscillatable unit
5 Drive/receiver unit
6 Electronics unit
8 Base
9*a*, 9*b* Oscillating elements
10*a*, 10*b* Cavities
11*a*, 11*b* Piezoelectric elements
12 Disk-shaped element
13 Unit for determining and/or monitoring the temperature
14 Rod-shaped housing element
15, 15*a*, 15*b* Temperature sensors
M Medium
P Process variable
T, T1, T2 Temperatures
A Excitation signal
S Transmission signal
$E_A$ First receiving signal
$E_S$ Second receiving signal
$E_T$ Third receiving signal
$\Delta\phi$ Specifiable phase shift

The invention claimed is:

1. A device for determining a first process variable and a second process variable of a medium, the device comprising:

a sensor unit including a mechanically oscillatable unit, a first piezoelectric element, and a unit for determining a temperature of the medium, and an electronics unit, wherein the first process variable is a specifiable fill-level, a density, or a viscosity of the medium, wherein the second process variable is a sound velocity within the medium, wherein the device is embodied to excite the mechanically oscillatable unit via an excitation signal to produce mechanical oscillations, to detect the mechanical oscillations of the oscillatable unit, and to convert the detected mechanical oscillations into a first receiving signal, wherein the device is embodied to transmit a transmission signal and to receive the transmitted transmission signal as a second receiving signal, wherein the transmission signal is an ultrasound signal, wherein the unit for determining the temperature of the medium includes a first temperature and a second temperature sensor, wherein the first temperature sensor and the second temperature sensor are arranged at a distance from one another, wherein the first temperature sensor is arranged and configured to detect a first temperature in a first end region, facing the medium, of the sensor unit, wherein the second temperature sensor is arranged and configured to detect a second temperature in a second end region, facing away from the medium, of the sensor unit, and wherein the electronics unit is embodied to determine the first process variable using the first receiving signal and to adjust the first process variable using the first temperature, and wherein the electronics unit is further embodied to determine the second process variable using the second receiving signal and to adjust the second process variable using the second temperature.

2. The device according to claim 1, wherein the sensor unit further comprises a second piezoelectric element, wherein the first and the second piezoelectric element are embodied to excite the mechanically oscillatable unit via the excitation signal to produce the mechanical oscillations, to detect the mechanical oscillations of the oscillatable unit, and to convert the detected mechanical oscillations into the first receiving signal, wherein the first piezoelectric element is embodied to emit the transmission signal, and wherein the second piezoelectric element is embodied to receive the second receiving signal.

3. The device according to claim 2, wherein the mechanically oscillatable unit is a vibrating fork having a first oscillating element and a second oscillating element, and wherein the first piezoelectric element is at least partially arranged in the first oscillating element, and the second piezoelectric element is at least partially arranged in the second oscillating element.

4. The device according to claim 3, wherein the unit for determining a temperature includes a rod-shaped housing element that is arranged such that a longitudinal axis of the rod-shaped housing element is parallel to a longitudinal axis of the oscillatable unit, wherein the first temperature sensor is arranged in the first end region, facing the medium, of the housing element, and wherein the second temperature sensor is arranged in the second end region, facing away from the medium, of the housing element.

* * * * *